(12) United States Patent  (10) Patent No.: US 12,044,853 B2
Jiang et al.                (45) Date of Patent:     Jul. 23, 2024

(54) EYEBALL TRACKING SYSTEM OF NEAR-EYE DISPLAY DEVICE AND NEAR-EYE DISPLAY DEVICE

(71) Applicant: GOERTEK INC., Shandong (CN)

(72) Inventors: Bin Jiang, Shandong (CN); Hongen Ren, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 477 days.

(21) Appl. No.: 17/606,170

(22) PCT Filed: Dec. 31, 2019

(86) PCT No.: PCT/CN2019/130283
§ 371 (c)(1),
(2) Date: Oct. 25, 2021

(87) PCT Pub. No.: WO2021/128408
PCT Pub. Date: Jul. 1, 2021

(65) Prior Publication Data
US 2022/0197039 A1    Jun. 23, 2022

(30) Foreign Application Priority Data
Dec. 25, 2019   (CN) .......................... 201911358410.2

(51) Int. Cl.
*G02B 27/01*    (2006.01)
*G02B 26/00*    (2006.01)
(Continued)

(52) U.S. Cl.
CPC ....... *G02B 27/0172* (2013.01); *G02B 26/008* (2013.01); *G02B 26/0833* (2013.01);
(Continued)

(58) Field of Classification Search
None
See application file for complete search history.

(56) References Cited

U.S. PATENT DOCUMENTS

2010/0110368 A1   5/2010   Chaum
2013/0077049 A1   3/2013   Bohn
(Continued)

FOREIGN PATENT DOCUMENTS

CN   102955255   3/2013
CN   103119512   5/2013
(Continued)

OTHER PUBLICATIONS

International Search Report issued in PCT/CN2019/130283 dated Sep. 28, 2020.
(Continued)

*Primary Examiner* — Bao-Luan Q Le
*Assistant Examiner* — Danell L Owens
(74) *Attorney, Agent, or Firm* — HAUPTMAN HAM, LLP

(57) ABSTRACT

An eye tracking system for a near-eye display device includes: a processor for outputting a video signal; a control analysis device for acquiring a multicolor image signal based on the video signal and a preset IR image signal, generating a color wheel control synchronization signal and a subfield display signal, generating an acquisition signal, and acquiring gaze point information based on an eye image; a color wheel device for rotating a color wheel in response to the color wheel control synchronization; a DMD display device for reflecting light form the color wheel into a lens in response to the subfield display signal to form an image and projecting the image onto an eye through an optical waveguide mirror; and an IR camera for acquiring the eye image in response to the acquisition signal.

14 Claims, 3 Drawing Sheets

(51) Int. Cl.
*G02B 26/08* (2006.01)
*G02B 27/00* (2006.01)

(52) U.S. Cl.
CPC .. *G02B 27/0093* (2013.01); *G02B 2027/0138* (2013.01); *G02B 2027/014* (2013.01)

(56) References Cited

U.S. PATENT DOCUMENTS

| | | |
|---|---|---|
| 2015/0331246 A1 | 11/2015 | Dewald et al. |
| 2016/0370591 A1* | 12/2016 | Wilson .................. G02B 27/02 |
| 2019/0018482 A1 | 1/2019 | Aleem et al. |
| 2019/0050051 A1 | 2/2019 | Cirucci et al. |
| 2019/0212827 A1 | 7/2019 | Kin et al. |
| 2019/0056599 A1 | 12/2019 | Reshidko et al. |
| 2020/0183155 A1 | 6/2020 | Xie et al. |
| 2021/0134208 A1 | 5/2021 | Yu et al. |

FOREIGN PATENT DOCUMENTS

| | | |
|---|---|---|
| CN | 103568955 | 2/2014 |
| CN | 204966536 | 1/2016 |
| CN | 107045256 A | 8/2017 |
| CN | 107515466 | 12/2017 |
| CN | 108259870 | 7/2018 |
| CN | 108803020 | 11/2018 |
| CN | 109358468 | 2/2019 |
| CN | 110045816 | 7/2019 |
| CN | 110161703 | 8/2019 |
| CN | 110275376 | 9/2019 |
| JP | 2009219644 | 10/2009 |
| WO | 2019122808 A1 | 6/2019 |

OTHER PUBLICATIONS

Notification to Grant Patent Right for Invention issued in corresponding Chinese Application No. 201911358410.2; mailed Nov. 13, 2020; 3 pgs.

* cited by examiner

EYEBALL TRACKING SYSTEM OF NEAR-EYE DISPLAY DEVICE AND NEAR-EYE DISPLAY DEVICE

This application is a 371 application of International Patent Application No. PCT/CN2019/130283, filed on Dec. 31, 2019 which claims the benefit of and priority to Chinese Patent Application No. 201911358410.2, titled "EYEBALL TRACKING SYSTEM OF NEAR-EYE DISPLAY DEVICE AND NEAR-EYE DISPLAY DEVICE", filed on Dec. 25, 2019 with the China National Intellectual Property Administration, which are incorporated herein by reference in their entireties.

FIELD

Embodiments of the present disclosure relate to the technical field of near-eye display, and in particular to an eye tracking system for a near-eye display device, and a near-eye display device.

BACKGROUND

DLP, that is, digital light processing, is a technology that uses a micro-mirror array integrated on a semiconductor chip and controls rotation of each of micro-mirrors with the MEMS technology. These micro-mirrors quickly change their respective angles in response to a digital drive signal. A micro-mirror is tilted by 10° when a corresponding signal is received, thereby changing a reflection direction of an incident light. A micro-mirror, when being in a projection state, is indicated as "on" and tilted by an angle of +10° in response to the digital signal. A micro lens, when being in a non-projection state, is indicated as "off" and tilted by an angle of −10°. Further, the incident light reflected by the micro-mirror that is "on" passes through a transmission lens to form an image on a screen. The incident light reflected by the micro-mirror that is "off" is absorbed by a light absorber.

When a person looks in different directions, there are slight changes in their eyes, which produce extractable features. These features are extracted by a computer through image capturing or scanning, so as to track the changes in the eyes in real time, and predict user status and demand as well as respond to the user status and demand, thereby controlling a device with eyes. Described above is a basic principle of eye tracking technology.

In recent years, with development of VR/AR and other head-mounted products, an efficient user interaction technology is urgently required. As an interactive method, the eye tracking technology can complete human-computer interaction by only eyes without user hands or a language. Eye tracking is widely used.

At present, most eye tracking systems in the art generally use IR infrared radiation and infrared cameras, and operate in a dark pupil manner or a bright pupil manner depending on placement positions of an IR LED. IR LEDs are evenly arranged around an eye and emit uniform infrared light to illuminate the eye. A part of the infrared light enters the eye through a pupil, and other part of the infrared light is reflected back. Therefore, a dark area captured by the camera is regarded as the pupil. An IR light source is arranged around the proximity to an optical axis, so that IR light is reflected from the back of the eye after entering the eye. In this case, the pupil is bright and therefore a bright area captured by the camera is regarded as the pupil. In both of the dark pupil manner and the bright pupil manner, the IR LEDs are arranged around the eye, and the IR camera for capturing the pupil is arranged under the eye. Since head-mounted devices such as VR or AR devices each provided with a small space near the eye, arrangement of the IR camera brings a significant difficulty to project implementation, and may result in increased overall volume and high cost of the device.

In view of this, how to provide an eye tracking system for a near-eye display device and a near-eye display device which solve the above technical problems has become a problem to be solved by those skilled in the art.

SUMMARY

An objective of embodiments of the present disclosure is to provide an eye tracking system for a near-eye display device and a near-eye display device, which are based on a light and thin lens, thereby reducing overall volume of the device and cost of the device.

To solve the above technical problems, an eye tracking system for a near-eye display device is provided according to an embodiment of the present disclosure. The eye tracking system includes a processor, a control analysis device, a color wheel device, a DMD display device, and an IR camera. The color wheel device includes a light source and a color wheel provided with multiple phosphor sections corresponding to different colors, where the multiple phosphor sections includes an IR phosphor section. The processor is configured to output a video signal corresponding to a video currently displayed on the near-eye display device. The control analysis device is configured to: acquire a multicolor image signal corresponding to the multiple phosphor sections on the color wheel based on the video signal and a preset IR image signal; generate a color wheel control synchronization signal and a subfield display signal corresponding to the color wheel control synchronization signal; generate an acquisition signal when the color wheel control synchronization signal and the subfield display signal both correspond to the IR image signal; and acquire gaze point information based on an eye image captured by the IR camera. The color wheel device is configured to rotate the color wheel in response to the color wheel control synchronization signal so that a phosphor section is illuminated by the light source to emit light of a color. The light is transmitted into the DMD display device. The DMD display device is configured to reflect the light into a lens in response to the subfield display signal to form an image of the color, and project the image onto an eye through an optical waveguide lens. The IR camera is configured to capture the eye image in response to the acquisition signal.

In an embodiment, the preset IR image signal is acquired based on a preset to-be-illuminated position on the eye, and a preset pattern.

In an embodiment, the multicolor image signal corresponding to the plurality of phosphor sections on the color wheel is acquired based on the video signal and the preset IR image signal by: performing image segmentation on the video signal according to a color sequential display rule to obtain primary color image signals respectively corresponding to the multiple phosphor sections on the color wheel; and inserting the preset IR image signal among the primary color image signals to obtain the multicolor image signal including the IR image signal.

In an embodiment, the multiple phosphor sections on the color wheel have a same length.

In an embodiment, a blank section of a preset length is arranged between two adjacent phosphor sections on the color wheel.

In an embodiment, the multiple phosphor sections on the color wheel include an R phosphor section, a G phosphor section, a B phosphor section, and an IR phosphor section.

In an embodiment, the color wheel device further includes a color wheel driver, a condenser lens and a homogenization lens. The color wheel driver is configured to generate, based on the color wheel control synchronization signal, a color wheel drive signal to drive the color wheel to rotate, so that light emitted from the light source is transmitted through the condenser lens to illuminate the phosphor section on the color wheel to emit the light corresponding to the phosphor section. The homogenization lens is configured to convert the light emitted from the color wheel into light with uniform brightness and transmit the converted light into the DMD display device.

In an embodiment, the light source is an LED light source.

A near-eye display device is provided according to an embodiment of the present disclosure. The near-eye display device includes the eye tracking system as described above.

In an embodiment, the near-eye display device is an AR head-mounted device.

An eye tracking system for a near-eye display device is provided according to an embodiment of the present disclosure. The eye tracking system includes a processor, a control analysis device, a color wheel device, a DMD display device and an IR camera. The color wheel device includes a light source and a color wheel provided with multiple phosphor sections corresponding to different colors. The multiple phosphor sections includes an IR phosphor section. The processor is configured to output a video signal corresponding to a video currently displayed on the near-eye display device to the control analysis device. The control analysis device is configured to: acquire, based on the video signal and a preset IR image signal, a multicolor image signal including the IR image signal and corresponding to the multiple phosphor sections; generate a color wheel control synchronization signal and a subfield display signal corresponding to the color wheel control synchronization signal; and transmit the color wheel control synchronization signal to the color wheel device, and transmit the subfield display signal to the DMD display device. The color wheel device rotates the color wheel in response to the color wheel control synchronization signal, so that a phosphor section is illuminated by the light source to emit light of a color. The light is transmitted into the DMD display device. Further, in response to the subfield display signal, the DMD display device reflects the light into a lens to form an image and projects the image onto an eye through an optical waveguide lens. When the color wheel control synchronization signal transmitted to the color wheel device and the subfield display signal transmitted to the DMD display device both correspond to the IR image signal, the image projected onto the eye corresponds to the IR image signal, and the control analysis device generates an acquisition signal. The IR camera captures an eye image in response to the acquisition signal. The control analysis device acquires the eye image and analyzes the eye image to obtain gaze point information. In this way, eye tracking is implemented. According to the present disclosure, it is unnecessary to arrange IR LEDs around the lens. Therefore, the lens is light and thin, thereby reducing overall volume and cost of the device. A near-eye display device is further provided in the present disclosure, which has the same beneficial effects as described above.

BRIEF DESCRIPTION OF THE DRAWINGS

In order to more clearly illustrate technical solutions in embodiments of the present disclosure, the drawings to be used in the description of the embodiments or the conventional technology are briefly described hereinafter. Apparently, the drawings described below illustrate only some embodiments of the present disclosure. Other drawings may be obtained by those skilled in the art from the drawings without any creative effort.

DETAILED DESCRIPTION

An eye tracking system of a near-eye display device and a near-eye display device are provided according to embodiments of the present application provide. The eye tracking system includes a thin lens, so that an overall volume and cost of the device are reduced.

In order to make the objectives, technical schemes and advantages of the embodiments of the present disclosure clearer, technical solutions in embodiments of the present disclosure are described clearly and completely hereinafter in conjunction with the drawings in the embodiments. It is apparent that the described embodiments are only some rather than all of the embodiments of the present disclosure. All other embodiments acquired by those skilled in the art based on the embodiments of the present disclosure without any creative effort shall fall within the protection scope of the present disclosure.

Figure 1:
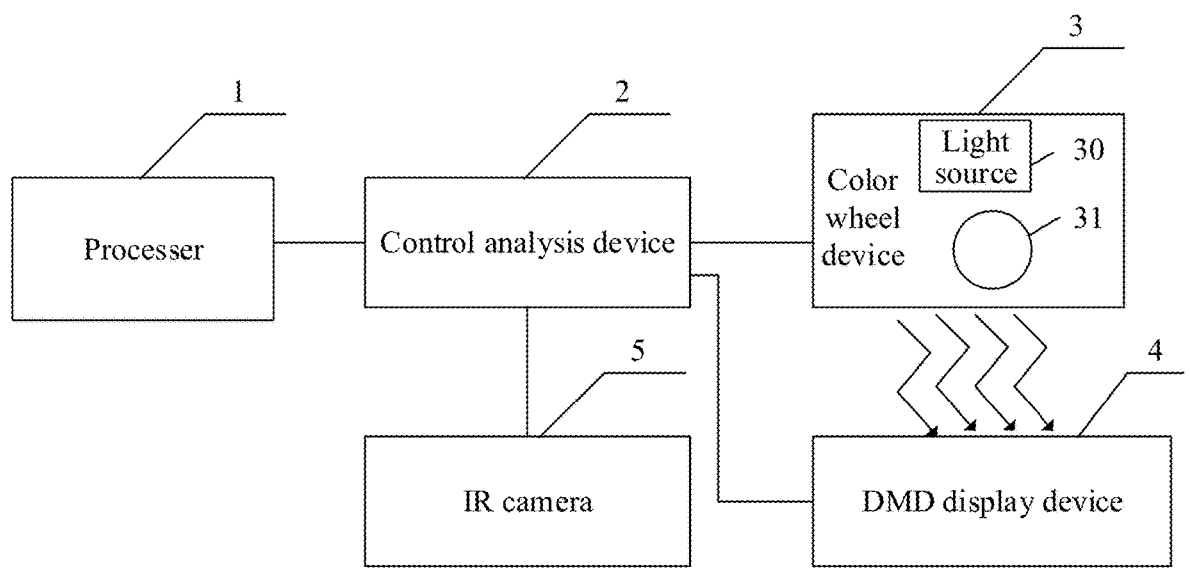
FIG. 1 is a schematic structural diagram of an eye tracking system for a near-eye display device according to an embodiment of the present disclosure.

Reference is made to FIG. 1, which is a schematic structural diagram of an eye tracking system for a near-eye display device according to an embodiment of the present disclosure.

The eye tracking system for a near-eye display device includes a processor 1, a control analysis device 2, a color wheel device 3, a DMD display device 4, and an IR camera 5. The color wheel device 3 includes a light source 30 and a color wheel 31 provided with multiple phosphor sections with corresponding to different colors, where the multiple phosphor sections include an IR phosphor section.

The processor 1 is configured to output a video signal corresponding to a video currently displayed on the near-eye display device.

The control analysis device 2 is configured to: acquire a multicolor image signal corresponding to the multiple phosphor sections on the color wheel 31 based on the video signal and a preset IR image signal, and generate a color wheel control synchronization signal and a subfield display signal corresponding to the color wheel control synchronization signal; generate an acquisition signal when the color wheel control synchronization signal and the subfield display signal both correspond to the IR image signal; and acquire gaze point information based on an eye image captured by the IR camera.

The color wheel device 3 is configured to rotate the color wheel 31 in response to the color wheel control synchronization signal, so that a phosphor section is illuminated by the light source 30 to emit light of a color. The light emitted by the color wheel is transmitted into the DMD display device 4.

The DMD display device 4 is configured to reflect the light into a lens in response to the subfield display signal to form an image of the color, and project the image onto an eye through an optical waveguide mirror.

The IR camera 5 is configured to capture the eye image in response to the acquisition signal.

It should be noted that according to the present disclosure, the color wheel 31 of the color wheel device 3 is provided with multiple phosphor sections corresponding to different colors. One turn of the color wheel 31 represents a cycle of images of a frame. A length of each phosphor section corresponds to display duration of an image of a color corresponding to the phosphor section. In the present disclosure, the color wheel 31 rotates at a constant speed. The light source 30 is disposed in the color wheel device 3 to illuminate the color wheel 31. A phosphor section is illuminated by the light source 30 as the color wheel 31 rotates, so that the color wheel 31 emits light of a color. The color wheel 31 may be disposed inside an optical machine, not occupying additional space of the near-eye display device. The light source 30 applied in the present disclosure is an LED light source or a laser light source, which is determined as needed, and is not limited herein.

In the present disclosure, the processor 1 outputs a video signal corresponding to a video currently displayed on the near-eye display device to the control analysis device 2. The video displayed on the near-eye display device is rendered by the near-eye display device itself, or is acquired from a network or acquired in other manners. When receiving the video signal, the control analysis device 2 performs image segmentation on the video signal according to a color sequential display rule to obtain primary color image signals corresponding to the multiple phosphor sections on the color wheel 31, respectively. A preset IR image signal is then inserted among the primary color image signals to obtain a multicolor image signal including the IR image signal. For example, in a case where the color wheel is provided with phosphor sections of the three primary colors of R, G, and B (that is, red, green, and blue), three primary color image signals including an R image signal, a G image signal, and a B image signal are obtained after image segmentation is performed on the video signal. The preset IR (infrared) image signal is inserted among the three primary color image signals, so that a four-color image signal including R, G, B and IR image signals is obtained. The image signals are in a sequence determined based on an order in which the phosphor sections are arranged on the color wheel 31 and a direction in which the color wheel 31 rotates.

After obtaining the multicolor image signal, the control analysis device 2 generates, based on the multicolor image signal, a color wheel control synchronization signal and a subfield display signal corresponding to the color wheel control synchronization signal. The color wheel control synchronization signal is transmitted to the color wheel device 3, and the subfield display signal is transmitted to the DMD display device 4. The color wheel control synchronization signal is an illumination timing signal in response to which the phosphor sections on the color wheel are illuminated by the light source 30 so as to emit light. The subfield display signal is a DMD display timing signal for the DMD display device 4. The illumination timing signal corresponds to the DMD display timing signal. In other words, the color wheel device 3 controls the color wheel to rotate in response to the color wheel control synchronization signal, so that a phosphor section faces the light source 30 and is illuminated by the light source 30. The color wheel 31 emits light with a color corresponding to the phosphor section. The light is transmitted into the DMD display device 4, specifically to the DMD of the DMD display device 4. The DMD reflects the light into a lens (which refers to a lens of the optical machine) in response to the received subfield display signal corresponding to the phosphor section (where the subfield display signal is an image signal corresponding to the phosphor section, for example, a subfield display signal corresponding to an R phosphor section is an R image signal), to form an image of a color and project the image onto the eye through the optical waveguide lens. When images respectively corresponding to primary colors are projected onto the eye, a colorful image is seen. For example, for the three primary colors including R color, G color, and B color, a colorful image is seen when images respectively corresponding to an R image signal, a G image signal, and a B image signal are projected onto the eye. An image corresponding to an IR image signal is not seen when being projected onto the eye since the IR light is invisible. Therefore, a visual effect is not affected, and an image corresponding to the IR image signal is captured by the IR camera. Based on this, when the color wheel control synchronization signal and the subfield display signal both correspond to the IR image signal, that is, when the color wheel 31 rotates to place the IR phosphor section in a position being illuminated by the light source 30 so as to emit IR light, and the DMD display device 4 receives the subfield display signal corresponding to the IR phosphor section and projects an IR image onto the eye through the lens, the control analysis device 2 transmits the acquisition signal to the IR camera 5 so that the IR camera 5 captures an eye image. The control analysis device 2 acquires the eye image captured by the IR camera 5 and then applies an analysis algorithm to calculate the gaze point information of the eye (which specifically is a gaze distance and position of the eye). In this way, eye tracking is implemented.

Figure 2:
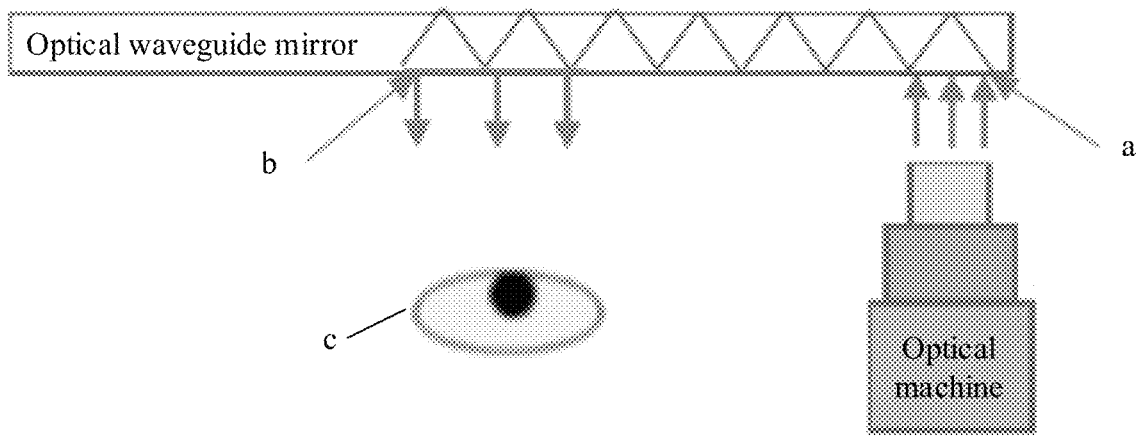
FIG. 2 is a schematic diagram of a principle of projecting an image onto an eye by an optical machine according to an embodiment of the present disclosure.

It should be noted that, reference is made to FIG. 2 for a principle that the DMD display device 4 reflects the light into the lens to form an image of a corresponding color and projects the image onto the eye when receiving the subfield display signal. Light from the lens in the optical machine are projected onto the eye through an optical waveguide mirror. An input region a is provided with a prism, a micro-mirror array, a diffraction grating, or the like. An output region b is provide with a prism, a micro-mirror array, a diffraction grating, or the like. When the IR light is emitted, the IR camera 5 is activated to capture the eye image (which specifically is an image of the pupil).

Furthermore, the preset IR image signal in the present disclosure is obtained based on a preset to-be-illuminated position on the eye and a preset pattern.

Specifically, the to-be-illuminated position on the eye and the preset pattern are set in advance. An IR pattern to be finally projected onto the eye by the DMD display device 4 when the IR phosphor section is illuminated to emit light is determined based on the to-be-illuminated position on the eye and the preset pattern. In practical applications, a to-be-illuminated area on the eye is preset, for example, only a certain area on the eye is to-be-illuminated, so as to simplify calculation of the algorithm or take a person with a defective eye (such as strabismus) into consideration. Compared with the conventional technology in which the LEDs are arranged around the eye to illuminate the entire eye and thus a to-be-illuminated area cannot be flexibly preset, application of the present disclosure is wider and more flexible.

Furthermore, a process of the control analysis device 2 acquiring a multicolor image signal corresponding to the multiple phosphor sections on the color wheel based on the video signal and a preset IR image signal is described as follows. The control analysis device 2 performs image segmentation on the video signal according to a color sequential display rule to obtain primary color image signals corresponding to the multiple phosphor sections on the color wheel, respectively. The control analysis device 2 inserts the preset IR image signal among the primary color image signals to obtain the multicolor image signal including the IR image signal.

Specifically, when receiving the video signal, the control analysis device 2 performs image segmentation on the video signal according to the color sequential display rule to obtain primary color image signals corresponding to phosphor sections on the color wheel 31, respectively. Then, the control analysis device 2 inserts the preset IR image signal among the primary color image signals to obtain the multicolor image signal including the IR image signal. For example, in a case where the color wheel is provided with phosphor sections of the three primary colors of R, G, and B (that is red, green, and blue), three primary color image signals including an R image signal, a G image signal, and a B image signal are obtained after image segmentation is performed on the video signal. Then, the preset IR (infrared) image signal is inserted among the three primary color image signals, so that a four-color image signal including the R image signal, the G image signal, the B image signal and the IR image signal is obtained. The image signals is in a sequence determined based on an order in which the phosphor sections are arranged on the color wheel 31 and a direction in which the color wheel 31 rotates.

Furthermore, the multiple phosphor sections on the color wheel 31 have a same length.

Specifically, the phosphor sections on the color wheel 31 are distributed uniformly with a same length so that periods of timing signals respectively corresponding to the phosphor sections are equal. Alternatively, the phosphor sections differ in length. A length of each of the phosphor sections is set as needed, and is not limited herein. A large proportion of a phosphor section in length indicates long duration in which the phosphor section is illuminated to emit light.

In addition, in order to improve a tolerance for timing mismatch, a blank section having a preset length is arranged between two adjacent phosphor sections on the color wheel. That is, a region coated with no phosphor is arranged between two adjacent phosphor sections. During the rotation of the color wheel 30, no light is emitted during a time period corresponding to the blank section, that is, no image is displayed on the DMD display device 4 during this time period.

Specifically in the present disclosure, the multiple phosphor sections arranged on the color wheel 31 include four phosphor sections, namely, an R phosphor section, a G phosphor section, a B phosphor section, and an IR phosphor section. The R phosphor section, the G phosphor section and the B phosphor section respectively correspond to primary colors of R, G and B.

In actual applications, in additional to the four specific phosphor sections, phosphor sections of primary colors and the IR phosphor section are alternately arranged, which depends on an actual situation, and is not limited herein.

Figure 3:
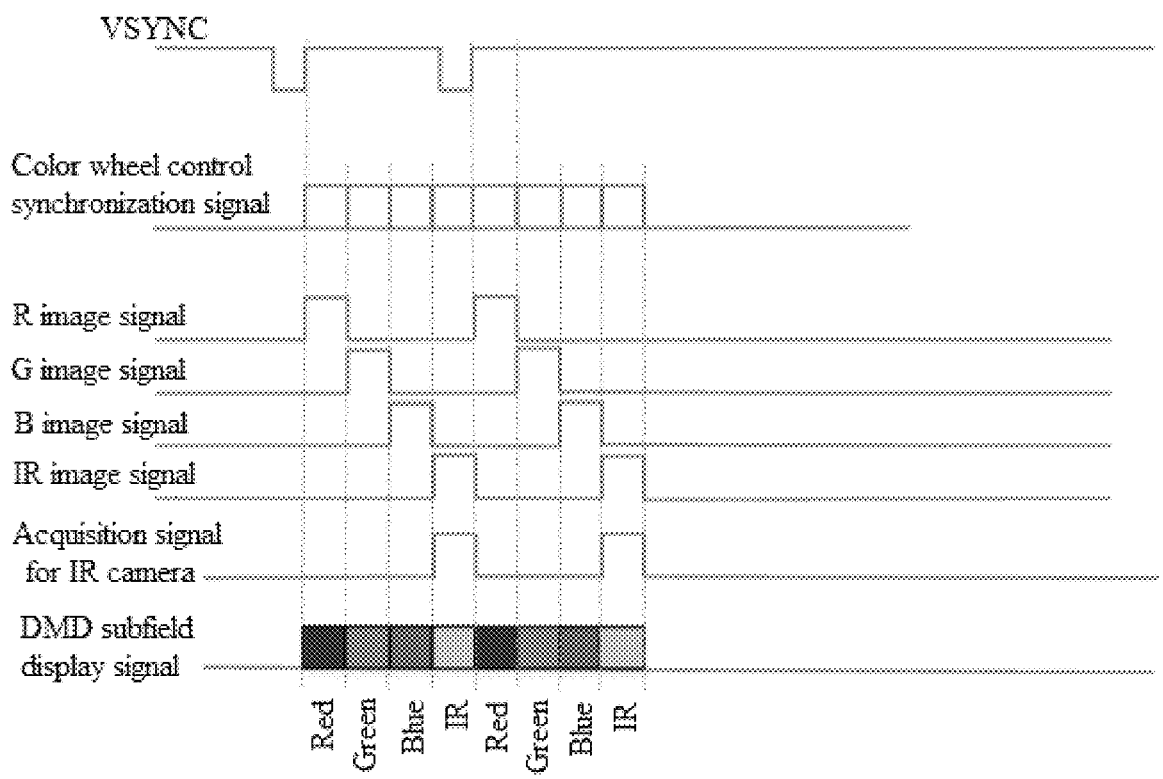
FIG. 3 is a schematic diagram of a timing signal according to an embodiment of the present disclosure.

Moreover, reference is made to FIG. 3 for the illumination timing signal and the DMD display timing signal in a case where the multiple phosphor sections on the color wheel 31 include an R phosphor section, a G phosphor section, a B phosphor section, and an IR phosphor section. In FIG. 3, VSYNC represents a frame signal. During display cycle of a frame of images, the R phosphor section, the G phosphor section, the B phosphor section, and the IR phosphor section are sequentially illuminated to emit light. The IR camera 5 is triggered when the IR phosphor section is illuminated and emits light, to capture an eye image of the eye. Since the micro-mirror array in the DMD display device 4 flips rapidly, inserting an IR timing signal among the RGB timing signals does not reduce a display refresh rate, that is, a frequency of the VSYNC.

It should also be noted that duty cycles respectively corresponding to the R phosphor section, the G phosphor section, the B phosphor section, and the IR phosphor section in the present disclosure are set based on actual needs. Moreover, the duty cycle corresponding to the R phosphor section may be increased by arranging two IR phosphor sections on the color wheel 31, thereby increasing a frame rate, that is, a speed, of eye tracking.

Figure 4:
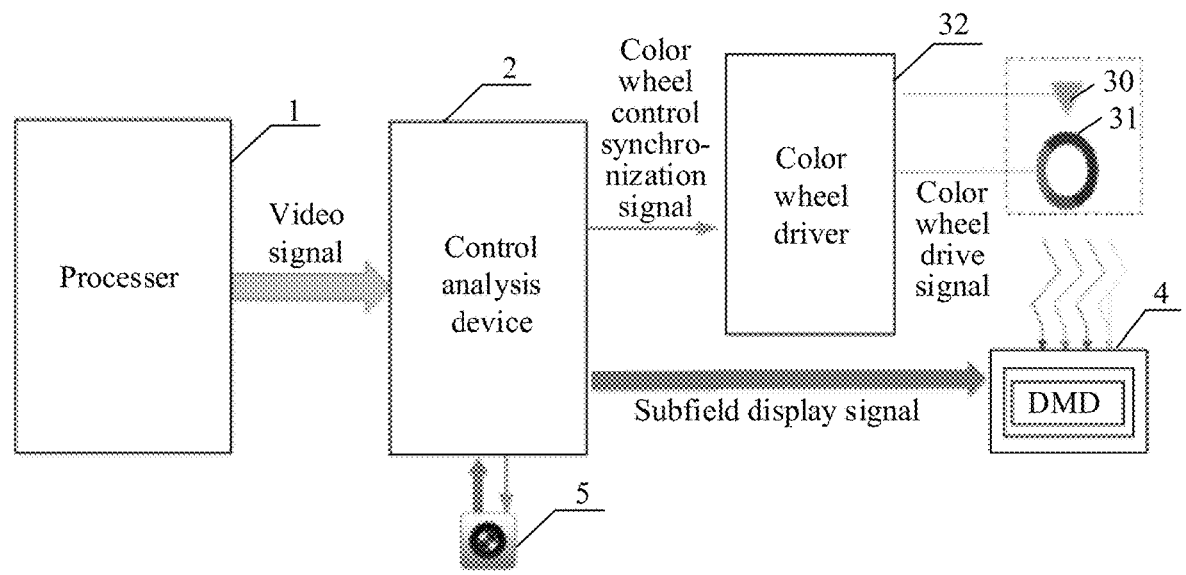
FIG. 4 is a schematic structural diagram of an eye tracking system for a near-eye display device according to another embodiment of the present disclosure.
Figure 5:
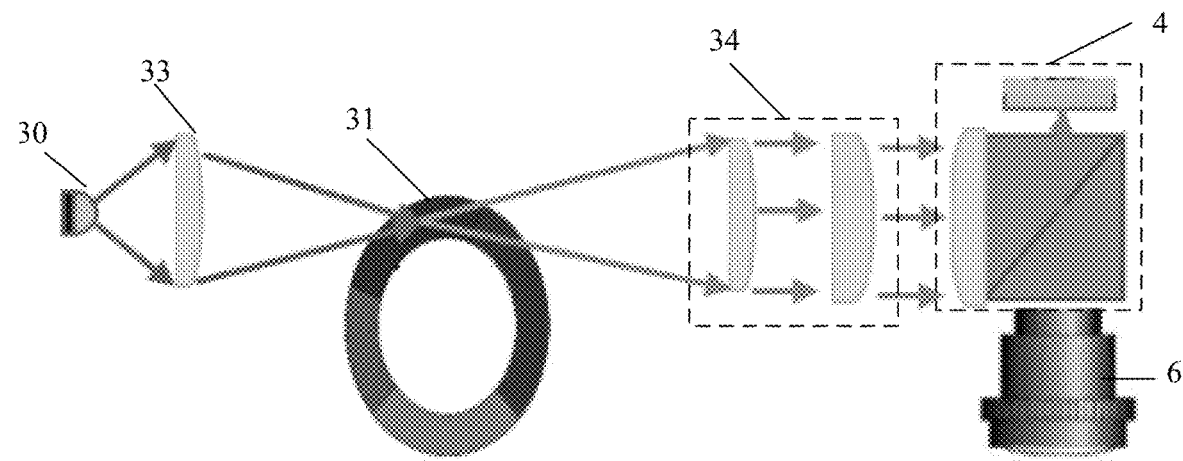
FIG. 5 is a schematic diagram showing an internal structure of an optical machine according to an embodiment of the present disclosure.

Referring to FIG. 4 and FIG. 5, the color wheel device 3 in the present disclosure further includes a color wheel driver 32, a condenser lens 33 and a homogenization lens 34.

The color wheel driver 32 is configured to generate, based on the color wheel control synchronization signal, a color wheel drive signal to drive the color wheel 31 to rotate, so that the light emitted from the light source 30 is transmitted through the condenser lens 33 to illuminate a phosphor section on the color wheel 31 to emit a light of a color.

The homogenization lens 34 is configured to convert the light emitted from the color wheel 31 into light with uniform brightness and transmit the converted light into the DMD display device 4.

Specifically in the present disclosure, the control analysis device 2 transmits the generated color wheel control synchronization signal to the color wheel driver 32 in the color wheel device 3. The color wheel driver 32 drives, in response to the color wheel control synchronization signal, the color wheel 31 to rotate, so that a phosphor section is illuminated by the light source 30 to emit light of a color. In the present disclosure, the condenser lens 33 is provided to converge the light emitted from the light source 30 so as to illuminate a certain position on the color wheel. Furthermore, the homogenization lens 34 is provided so that the light emitted from the color wheel 31 under illumination by the light source 30 is transmitted into the DMD display device 4 through the homogenizer lens 34. Therefore, the brightness of the light emitted from the color wheel 31 is uniform, thereby improving quality of a final image.

It should be noted that the light source 30, the condenser lens 33, the color wheel 31, the homogenization lens 34, the DMD display device 4 and a lens 6 in the color wheel device 3 according to the present disclosure are all disposed inside the optical machine, as shown in FIG. 5.

As can be seen from the present disclosure, the processor is configured to output a video signal corresponding to a video currently displayed on the near-eye display device to the control analysis device. The control analysis device is configured to: generate, based on the video signal and a preset IR image signal, a multicolor image signal including the IR image signal and corresponding to the multiple phosphor sections on a color wheel; generate a color wheel control synchronization signal and a subfield display signal corresponding to the color wheel control synchronization signal; and transmit the color wheel control synchronization signal to the color wheel device, and transmit the subfield display signal to the DMD display device. The color wheel device rotates the color wheel in response to the color wheel control synchronization signal, so that a phosphor section is illuminated by the light source to emit light of a color. The light is transmitted into the DMD display device. Further, when receiving the subfield display signal, the DMD display device reflects the light into a lens to form an image and projects the image onto an eye. When the color wheel control synchronization signal transmitted to the color wheel device and the subfield display signal transmitted to the DMD display device both correspond to the IR image signal, the image projected onto the eye corresponds to the IR image signal, and the control analysis device generates an acquisition signal. The IR camera captures an eye image in response to the acquisition signal. The control analysis device acquires the eye image and analyzes the eye image to obtain gaze point information. In this way, eye tracking is implemented. According to the present disclosure, it is unnecessary to arrange IR LEDs around the lens. Therefore, the lens is light and thin, thereby reducing overall volume and cost of the device.

Based on the above embodiments, a near-eye display device is provided according an embodiment of the present disclosure. The near-eye display device includes the eye tracking system as described above.

In an embodiment, the near-eye display device is an AR head-mounted device or a VR head-mounted device, which is not limited herein.

It should be noted that the near-eye display device provided in the present disclosure has the same beneficial effects as the eye tracking system for a near-eye display device provided in the above embodiments. Reference is made to the above embodiments for detailed description of the eye tracking system for a near-eye display device according to the present disclosure, which is not repeated herein.

Embodiments of the present disclosure are described in a progressive manner, each of the embodiments emphasizes differences from other embodiments, and the same or similar parts among the embodiments may be referred to each other. Description of the device disclosed in the embodiments is simplified, since the device corresponds to the system disclosed in the embodiments, reference may be made to the description of the system for related explanations.

It is further noted that the relational terms such as "first", "second" are merely used herein to distinguish one entity or operation from another, rather than to necessitate or imply an actual relationship or order of these entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, the statement described as "comprising/including a(n) . . . " does not exclude existence of another identical element in such process, method, article or device.

Those skilled in the art can implement or use the present disclosure based on the above description of the disclosed embodiments. It is apparent for those skilled in the art to make various modifications to these embodiments. The general principle defined herein may be applied to other embodiments without departing from the spirit or scope of the present disclosure. Therefore, the present disclosure is not limited to the embodiments described herein but has the widest scope that complies with the principle and novelty disclosed in this specification.

The invention claimed is:

1. An eye tracking system for a near-eye display device, comprising:
   a processor, a control analysis device, a color wheel device, a digital micro-mirror display (DMD) display device, and an infrared radiation (IR) camera, wherein
   the color wheel device comprises a light source and a color wheel provided with a plurality of phosphor sections corresponding to different colors, and the plurality of phosphor sections comprises an IR phosphor section;
   the processor is configured to output a video signal corresponding to a video currently displayed on the near-eye display device;
   the control analysis device is configured to:
      acquire a multicolor image signal corresponding to the plurality of phosphor sections on the color wheel based on the video signal and a preset IR image signal;
      generate a color wheel control synchronization signal and a subfield display signal corresponding to the color wheel control synchronization signal;
      generate an acquisition signal when the color wheel control synchronization signal and the subfield display signal both correspond to the IR image signal; and
      acquire gaze point information based on an eye image captured by the IR camera;
   the color wheel device is configured to rotate the color wheel in response to the color wheel control synchronization signal, to control the light source to illuminate a phosphor section so as to emit light of a color, wherein the light is transmitted into the DMD display device;
   the DMD display device is configured to reflect the light into a lens in response to the subfield display signal to form an image of the color, and project the image onto an eye through an optical waveguide mirror; and
   the IR camera is configured to capture the eye image in response to the acquisition signal.

2. The eye tracking system for a near-eye display device according to claim 1, wherein the preset IR image signal is acquired based on a preset to-be-illuminated position on the eye, and a preset pattern.

3. The eye tracking system for a near-eye display device according to claim 2, wherein the multicolor image signal corresponding to the plurality of phosphor sections on the color wheel is acquired based on the video signal and the preset IR image signal by:
   performing image segmentation on the video signal according to a color sequential display rule to obtain primary color image signals respectively corresponding to the plurality of phosphor sections on the color wheel; and
   inserting the preset IR image signal among the primary color image signals to obtain the multicolor image signal comprising the IR image signal.

4. The eye tracking system for a near-eye display device according to claim 1, wherein the plurality of phosphor sections on the color wheel have a same length.

5. The eye tracking system for a near-eye display device according to claim 1, wherein a blank section of a preset length is arranged between two adjacent phosphor sections on the color wheel.

6. The eye tracking system for a near-eye display device according to claim 1, wherein the plurality of phosphor sections on the color wheel comprise an R phosphor section, a G phosphor section, a B phosphor section, and an IR phosphor section.

7. The eye tracking system for a near-eye display device according to claim 6, wherein the color wheel device further comprises a color wheel driver, a condenser lens and a homogenization lens, wherein
the color wheel driver is configured to generate, based on the color wheel control synchronization signal, a color wheel drive signal to drive the color wheel to rotate, wherein light emitted from the light source is transmitted through the condenser lens to illuminate the phosphor section on the color wheel to emit the light corresponding to the phosphor section; and
the homogenization lens is configured to convert the light emitted from the color wheel into light with uniform brightness and transmit the converted light into the DMD display device.

8. The eye tracking system for a near-eye display device according to claim 7, wherein the light source is a light-emitting diode (LED) light source.

9. A near-eye display device, comprising the eye tracking system according to claim 1.

10. The near-eye display device according to claim 9, wherein the near-eye display device is an augmented reality (AR) head-mounted device.

11. The eye tracking system for a near-eye display device according to claim 2, wherein the plurality of phosphor sections on the color wheel comprises an R phosphor section, a G phosphor section, a B phosphor section, and an IR phosphor section.

12. The eye tracking system for a near-eye display device according to claim 3, wherein the plurality of phosphor sections on the color wheel comprises an R phosphor section, a G phosphor section, a B phosphor section, and an IR phosphor section.

13. The eye tracking system for a near-eye display device according to claim 4, wherein the plurality of phosphor sections on the color wheel comprises an R phosphor section, a G phosphor section, a B phosphor section, and an IR phosphor section.

14. The eye tracking system for a near-eye display device according to claim 5, wherein the plurality of phosphor sections on the color wheel comprises an R phosphor section, a G phosphor section, a B phosphor section, and an IR phosphor section.

* * * * *